(12) United States Patent
Robinson et al.

(10) Patent No.: US 10,415,563 B2
(45) Date of Patent: Sep. 17, 2019

(54) PUMPING SYSTEM, VIBRATION LIMITING DEVICE, AND METHOD

(71) Applicant: Caterpillar Inc., Peoria, IL (US)

(72) Inventors: Zachary Robinson, Peoria, IL (US); Thomas Brosowske, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 529 days.

(21) Appl. No.: 15/156,845

(22) Filed: May 17, 2016

(65) Prior Publication Data

US 2017/0335842 A1 Nov. 23, 2017

(51) Int. Cl.
| | |
|---|---|
| *F04B 53/00* | (2006.01) |
| *F16F 15/14* | (2006.01) |
| *F04B 39/00* | (2006.01) |
| *F04B 1/053* | (2006.01) |
| *F04B 17/05* | (2006.01) |
| *F04B 19/22* | (2006.01) |
| *F04B 9/04* | (2006.01) |

(52) U.S. Cl.
CPC ............ *F04B 53/004* (2013.01); *F04B 1/053* (2013.01); *F04B 9/04* (2013.01); *F04B 17/05* (2013.01); *F04B 19/22* (2013.01); *F04B 39/0088* (2013.01); *F04B 53/001* (2013.01); *F16F 15/145* (2013.01); *Y10T 74/2128* (2015.01)

(58) Field of Classification Search
CPC .. F04B 53/004; F04B 53/001; F04B 39/0088; F16F 15/145; Y10T 74/2128
USPC ........................................................ 74/574.2
See application file for complete search history.

(56) References Cited

U.S. PATENT DOCUMENTS

| | | | | |
|---|---|---|---|---|
| 2,348,941 | A * | 5/1944 | Ware ..................... | F16F 15/145 74/574.3 |
| 2,379,255 | A * | 6/1945 | Rubissow ............... | F16F 15/14 74/574.3 |
| 2,387,776 | A * | 10/1945 | Salomon ............... | F16F 15/145 74/574.2 |
| 5,884,735 | A * | 3/1999 | Eckel .................... | F16F 15/145 188/378 |
| 7,004,294 | B2 * | 2/2006 | Williams .............. | F16F 15/145 188/378 |
| 8,197,230 | B2 * | 6/2012 | Schell .................. | F16F 15/1232 267/137 |
| 8,469,826 | B2 * | 6/2013 | Brosowske ............. | F16D 31/06 29/888 |
| 8,517,685 | B2 * | 8/2013 | Manfredotti .......... | B64C 27/001 415/119 |
| 8,925,420 | B2 * | 1/2015 | Wysgol ................. | F16F 15/145 74/574.1 |
| 9,506,518 | B2 * | 11/2016 | Otanez .................. | F16F 15/145 |
| 9,551,397 | B2 * | 1/2017 | Verhoog ............... | F16F 15/145 |

(Continued)

FOREIGN PATENT DOCUMENTS

WO WO-2015192003 A1 * 12/2015 ........... E21B 47/007

*Primary Examiner* — Christopher S Bobish
(74) *Attorney, Agent, or Firm* — Jonathan F. Yates

(57) ABSTRACT

A mechanism for limiting vibration amplitudes in a pumping system includes a plurality of pendulum absorbers coupled with a carrier and each having a pivoting range. The pendulum absorbers each further include a first and a second contact surface that contacts an outer peripheral surface of the carrier at limit stop positions, and each having a shape that is conforming with a shape of the outer peripheral surface. The pumping system may be used for pumping liquid nitrogen.

19 Claims, 3 Drawing Sheets

(56) References Cited

U.S. PATENT DOCUMENTS

| | | | |
|---|---|---|---|
| 9,915,317 B2* | 3/2018 | Ubrich | |
| 10,072,728 B2* | 9/2018 | Takikawa et al. | |
| 10,094,444 B2* | 10/2018 | Movlazada | F16F 15/145 |
| 10,100,898 B2* | 10/2018 | Kram et al. | |
| 2002/0062713 A1* | 5/2002 | Feldhaus | F16F 15/145 |
| | | | 464/180 |
| 2010/0122605 A1* | 5/2010 | Maienschein | F16F 15/1457 |
| | | | 74/574.2 |
| 2011/0085924 A1* | 4/2011 | Shampine | F04B 53/003 |
| | | | 417/321 |
| 2013/0079160 A1* | 3/2013 | Brosowske | F16D 3/80 |
| | | | 464/27 |
| 2013/0283966 A1* | 10/2013 | Baral | F16F 15/145 |
| | | | 74/574.2 |
| 2015/0377318 A1* | 12/2015 | Byrne | F04B 19/22 |
| | | | 700/282 |
| 2018/0202515 A1* | 7/2018 | Fujiwara | |

* cited by examiner

PUMPING SYSTEM, VIBRATION LIMITING DEVICE, AND METHOD

TECHNICAL FIELD

The present disclosure relates generally to vibration limiting mechanisms used in rotary machines, and more particularly to a pendulum damper mechanism for limiting torsional vibrations in a pumping system.

BACKGROUND

The challenges presented by mechanical vibrations in rotating machinery are likely as old as rotating machinery itself. Vibrations of interest in rotating machinery can typically be classified as either torsional or transverse. Transverse vibrations in this context can be generally understood as oscillations about an equilibrium point that deflect a rotating element in directions transverse to the axis about which the element is rotating. Torsional vibrations are rotational oscillations circumferentially about the axis of rotation. If excessive vibrations are not addressed, mechanical fatigue and failure eventually tends to occur.

Various mechanisms are known for reducing or eliminating vibrations, either through dissipation of kinetic energy of vibrations to another energy form such as heat, or by absorbing kinetic energy from a vibrating system and then returning it to the system in a manner that is less disruptive to system operation or integrity. Certain strategies also seek to change the mass and vibrational characteristics of a given system so that harmonic excitation is less apt to occur during a typical duty cycle. Where multiple pieces of equipment are coupled together such as engines, transmissions, and driven loads such as pumps, compressors and the like, the multiple sources of rotation and reciprocation can produce complex vibrational phenomena that are difficult to even characterize, much less ameliorate. United States Patent Application Publication No. 2011/0085924 to Shampine et al. is entitled Pump Assembly Vibration Absorber System, and discloses one example of a resonant system applied to a pump assembly to counteract harmonic excitation therein.

SUMMARY OF THE INVENTION

In one aspect, a pumping system includes an engine, and a transmission coupled with the engine. The pumping system further includes a pump having a pump shaft and a plurality of pumping elements structured to reciprocate to transition a fluid between a pump inlet and a pump outlet. The pumping system further includes a driveline coupled between the transmission and the pump shaft, and a vibration-limiting mechanism coupled with the driveline between the transmission and the pump, and including a carrier fixed to rotate with the driveline, and a plurality of pendulum absorbers coupled to the carrier and each being pivotable about a separate pivot axis in response to torsional vibrations of the driveline. The pumping system further includes a gearbox coupled between the transmission and the pump and including an input gear coupled with the driveline and structured to rotate at a speed of rotation of the driveline, and an output gear coupled with the pump shaft and structured to rotate the pump shaft at a speed of rotation that is different from the speed of rotation of the driveline.

In another aspect, a mechanism for limiting vibration amplitudes in a rotary machine system includes a carrier including an outer peripheral surface extending circumferentially about a longitudinal center axis of the carrier, and a mounting surface structured for mounting the mechanism to a driveline in the rotary machine system. The mechanism further includes a plurality of pendulum absorbers coupled with the carrier and having a circumferential distribution about the longitudinal center axis, and each of the plurality of pendulum absorbers being pivotable about a separate pivot axis having an orientation that is parallel to an orientation of the longitudinal center axis. The plurality of pendulum absorbers each have a pivoting range and are movable in the pivoting range in response to torsional vibrations of the driveline transmitted to the carrier, and each of the plurality of pendulum absorbers further include a first contact surface that contacts the outer peripheral surface at a first limit stop position of the pivoting range, and a second contact surface that contacts the outer peripheral surface at a second limit stop position of the pivoting range, and each of the first contact surface and the second contact surface have a shape that is conforming with a shape of the outer peripheral surface.

In still another aspect, a method of operating a pumping system includes transmitting torque from a rotating driveline to a pump shaft of a pump to cause a plurality of pistons of the pump to reciprocate, and transitioning a fluid between a pump inlet and a pump outlet by way of the reciprocation of the plurality of pistons. The method further includes limiting an amplitude of torsional vibrations transmitted from the pump to the driveline by way of a plurality of pendulum absorbers of a vibration-limiting mechanism coupled to the driveline between the pump and an engine operating to rotate the driveline. The transmitting of the torque further includes transmitting the torque by way of a gearbox such that a speed of rotation of the pump shaft is different from a speed of rotation of the driveline.

DETAILED DESCRIPTION

Figure 1:
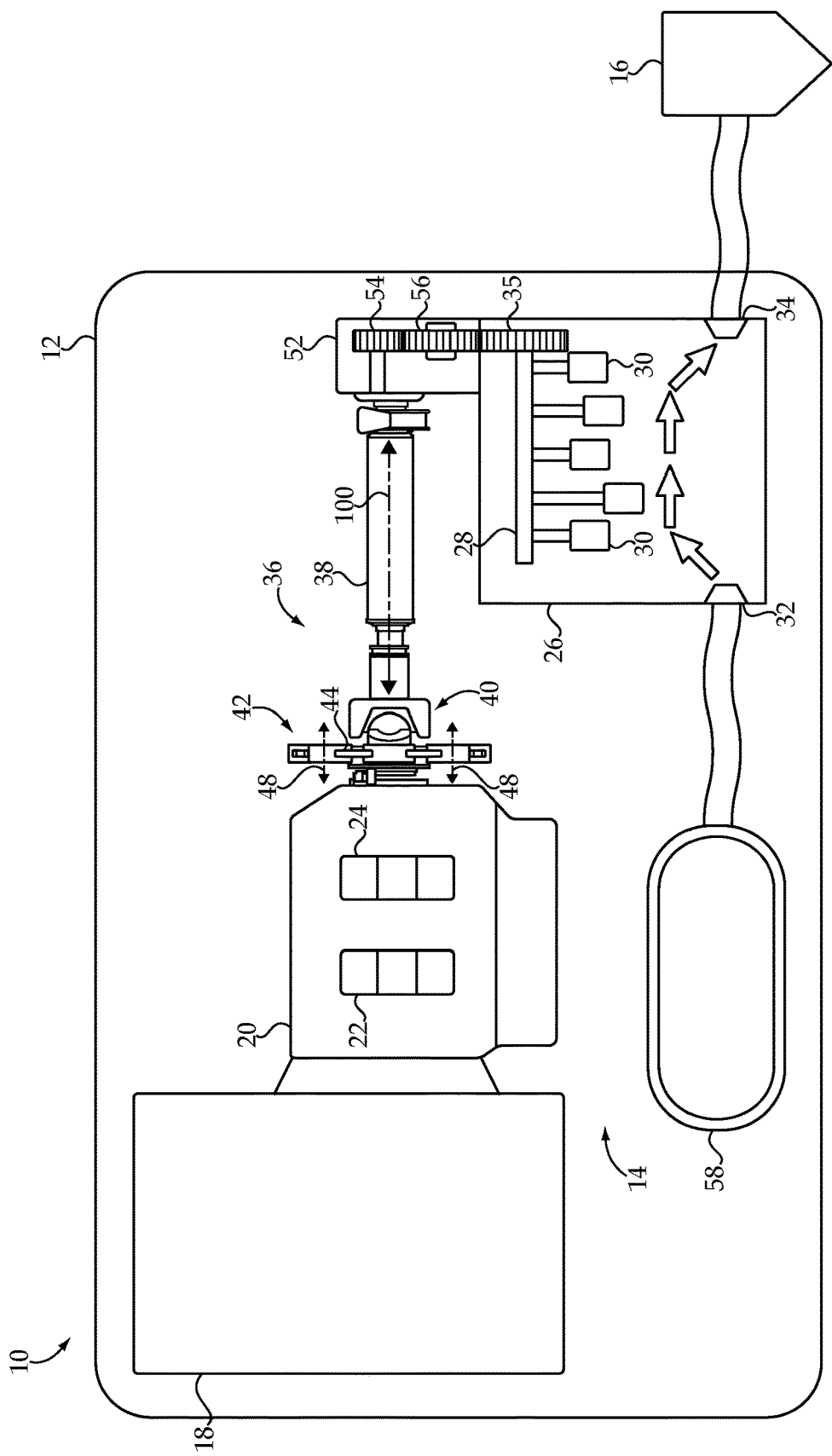
FIG. 1 is a diagrammatic view of a machinery rig including a pumping system having a vibration-limiting mechanism, according to one embodiment.

Referring to FIG. 1 there is shown a machinery rig 10 such as might be used in oilfield or gas field operations, according to one embodiment. Rig 10 may include a frame 12, which could be a vehicle trailer or the like, or a stationary platform, coupled with or having mounted thereon a plurality of components including a pumping system 14. In a practical implementation strategy, pumping system 14 can be coupled with a fluid injector 16 located at a wellhead that is structured to inject a fluid under pressure into a well for purposes of so-called hydraulic fracturing. In a practical implementation strategy, pumping system 14 may include or be coupled with a fluid supply, such as a cryogenic storage tank 58 or the like containing liquid nitrogen or a mixture containing liquid nitrogen.

Pumping system 14 further includes a source of rotary power such as an internal combustion engine 18, and a transmission 20 coupled with engine 18 and having a plurality of gears 22 and 24. Pumping system 14 further includes a pump 26 having a pump shaft 28 and a plurality of pumping elements 30 structured to reciprocate to transition a fluid between a pump inlet 23 and a pump outlet 34. In a practical implementation strategy, pumping elements 30 include pistons structure to move between advanced positions and retracted positions in response to rotation of pump shaft 28 in a generally conventional manner. Although five pistons 30 are shown in the illustrated embodiment, in other instances a different number of pistons might be used. A pump drive gear 35 is provided to impart torque to pump shaft 28. Pumping system 14 further includes a driveline 36 coupled between transmission 20 and pump shaft 28, and a vibration-limiting mechanism 42 coupled with driveline 36 between transmission 20 and pump 26. Driveline 36 typically includes at least one drive shaft 38, and may include multiple shafts coupled together by way of one or more universal joints 40. As will be further apparent from the following description, pumping system 14 is uniquely configured for limiting and/or managing certain mechanical vibrations that can occur during operation.

To this end, mechanism 42 includes a carrier 44 fixed to rotate with driveline 36, and a plurality of pendulum absorbers 46 coupled to carrier 44 and each being pivotable about a separate pivot axis 48 in response to torsional vibrations of driveline 36. Pumping system 14 further includes a gearbox 52 coupled between transmission 20 and pump 26, and including an input gear 54 coupled with driveline 36 and structured to rotate at a speed of rotation of driveline 36. Gearbox 52 further includes an output gear 56 coupled with pump shaft 28 and structured to rotate pump shaft 28 at a speed of rotation that is different from the speed of rotation of driveline 38. In one embodiment, gearbox 52 includes a speed reduction gearbox such that output gear 56 rotates pump shaft 28 at a speed of rotation that is less than the speed of rotation of driveline 36, although the present disclosure is not thereby limited. An example speed reduction ratio is about two to one (2:1), although speed could be reduced to a greater extent or a lesser extent in other embodiments.

Figure 2:
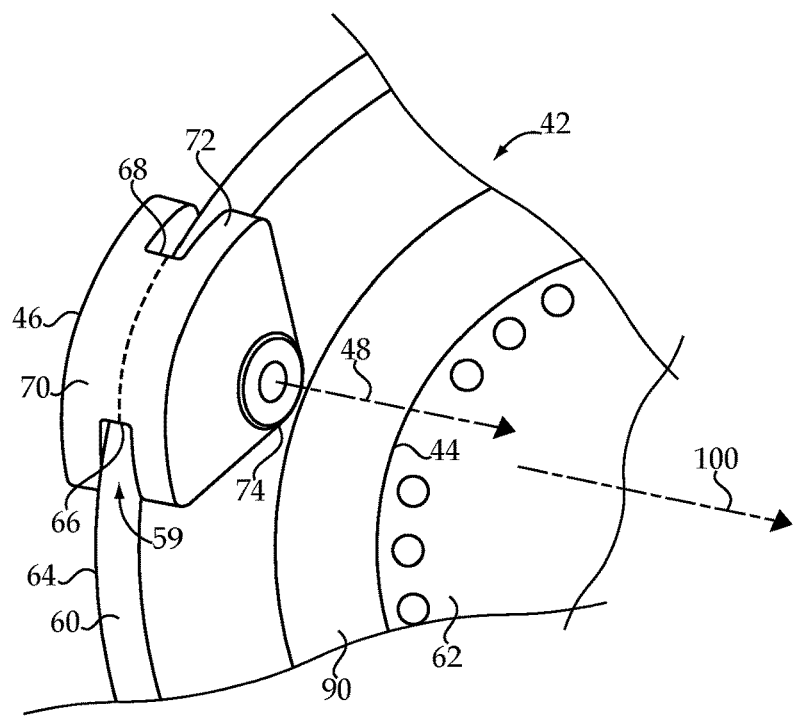
FIG. 2 is a diagrammatic view of a portion of a vibration-limiting mechanism, according to one embodiment.

Referring also now to FIG. 2 there are shown parts of mechanism 42 in greater detail. Only one pendulum absorber 46 is shown in FIG. 2 and described in connection therewith, however, it should be appreciated that the present description in the singular can be applied analogously to all of the pendulum absorbers typically used in mechanism 42. Carrier 44 includes an outer peripheral surface 60 extending circumferentially about a longitudinal center axis of carrier 44. Carrier 44 can be mounted coaxially with driveline 36, and thus axis 100 denotes both the carrier longitudinal center axis and the axis of rotation of driveline 36. A least one mounting surface 62 is also shown in FIG. 2. In a practical implementation strategy, carrier 44 can be bolted between adjacent shafts or shaft assemblies in driveline 36, and thus mounting surface 62 can take the form of an axial end surface. In other instances, carrier 44 could include a through-bore and be mounted circumferentially around a shaft or other component in driveline 36 with the shaft or other component being received in the through-bore. It can also be noted from FIG. 2 that pendulum absorber 46 has a channel 59 formed therein, and has a pivoting range about pivot axis 48. Pendulum absorber 46 is further movable about axis 48 in the pivoting range in response to torsional vibrations of driveline 36 that are transmitted to carrier 44. Pendulum absorber 46 further includes a first contact surface 66 that contacts outer peripheral surface 60 at a first limit stop position of the pivoting range, and a second contact surface 68 that contacts outer peripheral surface 60 at a second limit stop position of the pivoting range, and is pivotable between the first limit stop position and the second limit stop position. Each of the first contact surface 66 and the second contact surface 68 may have a shape that is conforming with a shape of outer peripheral surface 60. Each of first contact surface 66 and second contact surface 68 also defines in part a channel 59 receiving flange 64, and flange 64 being movable within channel 59 during pivoting of pendulum absorber 46. In a practical implementation strategy, outer peripheral surface 60 has a cylindrical shape, and is formed on a radially projecting flange 64 attached to and/or formed integrally with a center body 90. Each of the plurality of pivot axes 48 may be positioned so as to extend through radially projecting flange 64.

Figure 3:
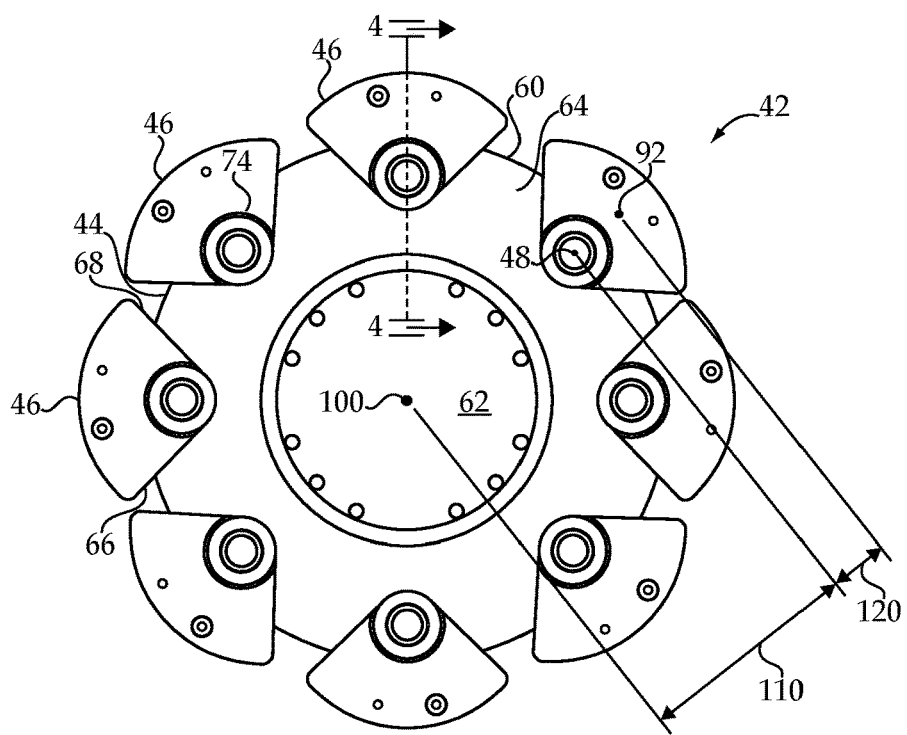
FIG. 3 is an end view of a vibration-limiting mechanism, according to one embodiment.

Referring also now to FIG. 3, there is shown an end view of mechanism 42 where it can be seen that each of pendulum absorbers 46 has generally a wedge shape in an axial projection. In other embodiments the shapes might be different, however. It can also be seen that pendulum absorbers 46 are eight in number and have a circumferential distribution about axis 100, and are generally uniformly distributed about axis 100 at a uniform radial spacing from axis 100. A relatively large radial line segment or radius 110 extends from axis 100 to axis 48, and a relatively smaller radial line segment or radius 120 extends from axis 48 to a center of mass 92, the significance of which will be further apparent from the following description.

Figure 4:
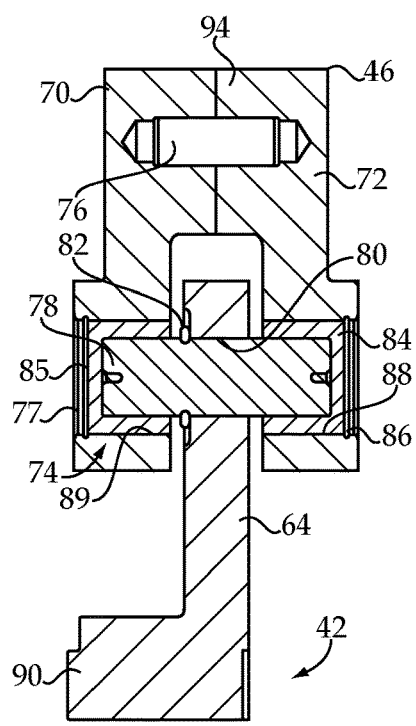
FIG. 4 is a sectioned view taken along line 4-4 of FIG. 3.

Referring also now to FIG. 4, there is shown a sectioned view taken along line 4-4 of FIG. 3, and illustrating certain additional features of mechanism 42. In the illustrated embodiment, pendulum absorber 46 is formed from two substantially identical halves 70 and 72. A pin 76 or other suitable fastener may couple together halves 70 and 72, and also a bearing 74. In a practical implementation strategy, a plurality of bearings, substantially identical to bearing 74, are provided that each rotatably support one of the plurality of pendulum absorbers 46 during pivoting between the respective first limit stop position and the second limit stop position. Each bearing 74 may include a pin 78 that extends through a bore 80 in flange 64, and each of a first cap 84 and a second cap 85. A snap ring 82 may be positioned about pin 78 between halves 70 and 72. A first snap ring 86 and a second snap ring 77 are positioned about pin 78 within bores 88 and 89 in halves 72 and 70, respectively.

Figure 5:
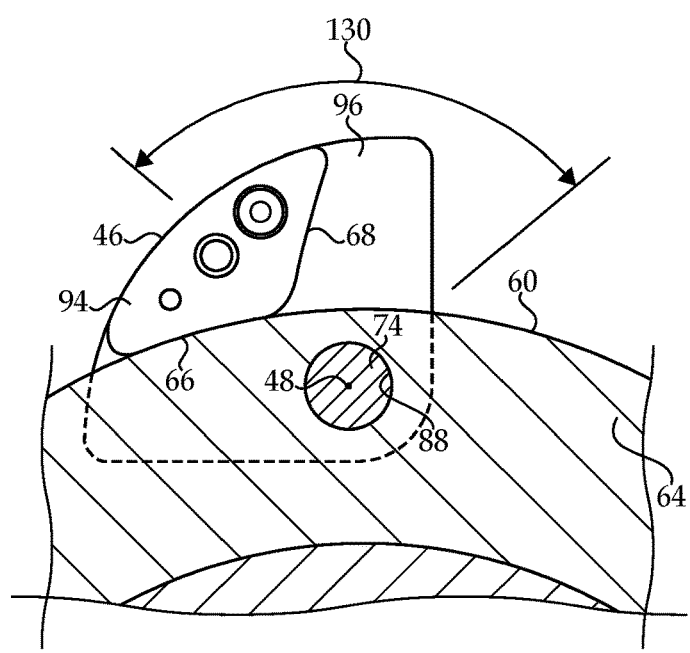
FIG. 5 is a partially sectioned end view of a portion of the vibration-limiting mechanism of FIG. 3.

Referring also to FIG. 5, there is shown a sectioned view that illustrates certain additional features of mechanism 42 in an axial section plane. As noted above, each pendulum absorber 46 can be movable in a pivoting range. In FIG. 5 the pivoting range is identified generally by way of reference numeral 130, and could be about 90 degrees although the present disclosure is not thereby limited. It will also be recalled that first contact surface 66 and second contact surface 68 may have shapes conforming with a shape of outer peripheral surface 60. As surface 60 may be cylindrical, shapes of contact surfaces 66 and 68 may be circular arcs in profile. It can also be noted that contact surfaces 66 and 68 are positioned upon a protrusion 94, or more particularly a portion of each of contact surfaces 66 and 68 are positioned upon each of a first and second protrusion of halves 70 and 72. Bore 88 may be formed in a base plate 96 of pendulum damper 46.

INDUSTRIAL APPLICABILITY

As discussed above, rig 10 may be used in the process of hydraulic fracturing. Conventional hydraulic fracturing technology employs water and other chemicals mixed with water, plus various proppants to hold open fractures formed in oil or gas bearing rocks. The basic hydraulic fracturing techniques have been in place for years. More recently there has been interest in employing alternative materials as fracturing fluid, and liquid nitrogen has shown promise for such purposes. It is believed that certain vibrational phenomena tend to be observed in hydraulic fracturing pumps pumping liquid nitrogen or liquid nitrogen-based fracturing fluid, but not with such pumps where water or water-based fracturing fluid is being used. While the present disclosure is not limited to any particular working fluid, it is believed to have advantageous applications where liquid nitrogen is being used.

During operation of system 14, engine 18 will be operated to apply torque to transmission 20, which in turn induces driveline 36 to rotate and drives pump 26 by way of gearbox 52. During operating pump 26 pumping elements 30 will typically reciprocate horizontally side to side, or vertically up and down, to transition fluid between pump inlet 32 and pump outlet 34. Interactions among the machine components as well as interactions with the pumped fluid produce torsional vibrations of pump shaft 28. The torsionals tend to be transmitted through gears 35, 56, and 54 of gearbox 52, or other gearbox configurations, and into driveline 36. It has been observed that torsional vibrations can eventually damage a transmission such as transmission 20, or other components of pumping system 14, if not controlled or reduced in amplitude.

According to the present disclosure, amplitude of torsional vibrations transmitted from pump 26 to driveline 36 can be limited by way of pendulum absorbers 46. Pendulum absorbers 46 can pivot upon their respective pivot axes and provide torque inputs to cancel out the torsionals, at least to a significant extent. While any pivoting mass can in some instances reduce, or other instances increase, vibration amplitudes, the present disclosure provides a unique strategy whereby a tuning order of vibration-limiting mechanism 42 may be different from a primary excitation order of pump 26. While many different vibrations can be produced by pump 26, fifth order vibrations may be of particular concern, at least with respect to potential damage to hardware of driveline 36 and/or transmission 20.

Tuning order of a pendulum absorber tends to be controlled by the square root of the ratio of radius 110, from the centerline or center axis to a pendulum mass pivot axis 48, to the radius from pivot axis 48 to the pendulum mass center of gravity 92. As a result, higher order tuning can require a high ratio while lower order tuning can require a lower ratio. A conventional simple pendulum absorber for absorbing higher order vibrations can be challenging to design, especially where packaging constraints exist. In other words, to obtain a high enough ratio, the relative difference between radius 110 and 120 needs to be relatively large, potentially limiting pendulum range of motion and pendulum mass, and therefore torque generating capability.

Where a pendulum device is operating at an increased speed of rotation relative to an excitation source, as here, the tuning order of the pendulum can be reduced according to the gear ratio that determines the difference in speed of rotation. For example, a fifth order excitation can be altered to a second order pendulum tuning relationship where the pendulum absorber is rotating at approximately two and one half times the speed of the excitation source. A sixth order excitation could be addressed with a third order pendulum tuning relationship where the pendulum absorber is rotating at approximately two times the speed of the excitation source. In the present disclosure, gearbox 52 provides a speed reduction that enables tuning order of mechanism 42 to be less than the principal or primary excitation order of the vibration source, in the illustrated case pump 26. Accordingly, mechanism 42 can be made substantially smaller and more effective than might otherwise be possible, providing sufficient dynamic torque for canceling out undesired torsionals in a reduced package size over what would otherwise be required.

The present description is for illustrative purposes only, and should not be construed to narrow the breadth of the present disclosure in any way. Thus, those skilled in the art will appreciate that various modifications might be made to the presently disclosed embodiments without departing from the full and fair scope of the present disclosure. Other aspects, features and advantages will be apparent upon an examination of the attached drawings and appended claims.

What is claimed is:

1. A pumping system comprising: an engine,
a transmission coupled with the engine;
a pump including a pump shaft and a plurality of pumping elements structured to reciprocate to transition a fluid between a pump inlet and a pump outlet;
a driveline coupled between the transmission and the pump shaft; a vibration-limiting mechanism coupled with the driveline between the transmission and the pump, and including a carrier fixed to rotate with the driveline, and a plurality of pendulum absorbers coupled to the carrier, the carrier including an outer peripheral surface extending circumferentially about a longitudinal center axis of the carrier;
a gearbox coupled between the transmission and the pump and including an input gear coupled with the driveline and structured to rotate at a speed of rotation of the driveline, and an output gear coupled with the pump shaft and structured to rotate the pump shaft at a speed of rotation that is different from the speed of rotation of the driveline;
each pendulum absorber has a pivoting range and is pivotable therethrough about a separate pivot axis in response to torsional vibrations of the driveline; and
each pendulum absorber includes a first contact surface that contacts the outer peripheral surface at a respective first limit stop position, and a second contact surface that contacts the outer peripheral surface at a respective second limit stop position, each first contact surface and second contact surface having a shape conforming with a shape of the outer peripheral surface.

2. The pumping system of claim 1 wherein a tuning order of the vibration-limiting mechanism is different from a primary excitation order of the pump.

3. The pumping system of claim 1 wherein the gearbox includes a speed reduction gearbox such that the output gear rotates the pump shaft at a speed of rotation that is less than the speed of rotation of the driveline.

4. The pumping system of claim 3 wherein the gearbox has a speed reduction ratio of about 2:1 or greater.

5. The pumping system of claim 3 wherein the driveline defines an axis of rotation, and the carrier of the vibration-limiting mechanism includes a radially projecting flange, and the plurality of pendulum absorbers are coupled to the radially projecting flange and the separate pivot axes extend through the radially projecting flange.

6. The pumping system of claim 5 wherein each of the plurality of pendulum absorbers has a channel receiving the flange, and the flange being movable within the channel during pivoting of the pendulum absorber.

7. The pumping system of claim 1 further comprising a plurality of bearings each supporting one of the plurality of pendulum absorbers during pivoting between the first limit stop position and the second limit stop position.

8. The pumping system of claim 1 wherein the pumping system is part of a machinery rig for hydraulic fracturing that includes a cryogenic storage tank containing liquid nitrogen.

9. The pumping system of claim 1 wherein the plurality of pendulum absorbers each include a first half and a second half, and each of the plurality of pendulum absorbers is coupled to the carrier by a pin that extends through the carrier such that the first half and the corresponding second half are positioned on opposite sides of the outer peripheral surface.

10. A mechanism for limiting vibration amplitudes in a rotary machine system comprising:
a carrier including an outer peripheral surface extending circumferentially about a longitudinal center axis of the carrier, and a mounting surface structured for mounting the mechanism to a driveline in the rotary machine system;
a plurality of pendulum absorbers coupled with the carrier and having a circumferential distribution about the longitudinal center axis, and each of the plurality of pendulum absorbers being pivotable about a separate pivot axis having an orientation that is parallel to an orientation of the longitudinal center axis;
the plurality of pendulum absorbers each having a pivoting range and being movable in the pivoting range in response to torsional vibrations of the driveline transmitted to the carrier, and each of the plurality of pendulum absorbers further including a first contact surface that contacts the outer peripheral surface at a first limit stop position of the pivoting range, and a second contact surface that contacts the outer peripheral surface at a second limit stop position of the pivoting range, and each of the first contact surface and the second contact surface having a shape that is conforming with a shape of the outer peripheral surface.

11. The mechanism of claim 10 wherein the carrier further includes a radially projecting flange, and the outer peripheral surface is formed on the radially projecting flange.

12. The mechanism of claim 11 wherein each of the separate pivot axes extends through the radially projecting flange.

13. The mechanism of claim 12 wherein the outer peripheral surface a cylindrical shape.

14. The mechanism of claim 12 further comprising a plurality of bearings rotatably supporting the plurality of pendulum absorbers.

15. The mechanism of claim 12 wherein each of the plurality of pendulum absorbers is formed from two substantially identical halves coupled together about the radially projecting flange.

16. The mechanism of claim 10 wherein each of the plurality of pendulum absorbers has a wedge shape in an axial projection plane.

17. A method of operating a pumping system comprising:
transmitting torque from a rotating driveline to a pump shaft of a pump to cause a plurality of pistons of the pump to reciprocate;
transitioning a fluid between a pump inlet and a pump outlet by way of the reciprocation of the plurality of pistons;
limiting an amplitude of torsional vibrations transmitted from the pump to the driveline by way of a vibration-limiting mechanism coupled to the driveline between the pump and an engine operating to rotate the driveline, the vibration-limiting mechanism including a carrier having an outer peripheral surface extending circumferentially about a longitudinal center axis, and a plurality of pendulum absorbers each having a first contact surface and a second contact surface conforming with a shave of the outer peripheral surface and each of the plurality of pendulum absorbers being coupled to the carrier so as to be pivotable through a pivoting range in response to torsional vibrations, such that the first contact surface contacts the outer peripheral surface at a first limit stop position, and the second contact surface contacts the outer peripheral surface at a second limit stop position; and
the transmitting further including transmitting the torque by way of a gearbox such that a speed of rotation of the pump shaft is different from a speed of rotation of the driveline.

18. The method of claim 17 wherein the transitioning includes transitioning liquid nitrogen between the pump inlet and the pump outlet.

19. The method of claim 18 wherein the limiting of the amplitude includes limiting the amplitude by way of the pendulum absorbers being tuned to an order different than a primary excitation order of the pump.

* * * * *